United States Patent
Kirloaskar et al.

(10) Patent No.: US 11,150,024 B2
(45) Date of Patent: Oct. 19, 2021

(54) PUMPING AND TRAPPING DEVICE

(71) Applicant: Forbes Marshall Private Limited, Maharashtra (IN)

(72) Inventors: Akshay Suhas Kirloaskar, Maharashtra (IN); Milind Mohan Pingale, Maharashtra (IN); Sudhir Somnath Alande, Maharashtra (IN)

(73) Assignee: FORBES MARSHALL PRIVATE LIMITED, Pune (IN)

( * ) Notice: Subject to any disclaimer, the term of this patent is extended or adjusted under 35 U.S.C. 154(b) by 126 days.

(21) Appl. No.: 16/476,928

(22) PCT Filed: Jan. 16, 2018

(86) PCT No.: PCT/IB2018/050249
§ 371 (c)(1),
(2) Date: Jul. 10, 2019

(87) PCT Pub. No.: WO2018/134725
PCT Pub. Date: Jul. 26, 2018

(65) Prior Publication Data
US 2019/0331424 A1    Oct. 31, 2019

(30) Foreign Application Priority Data

Jan. 19, 2017   (IN) .............. 201721002126

(51) Int. Cl.
*F28B 9/08*    (2006.01)
*F16T 1/24*    (2006.01)
(Continued)

(52) U.S. Cl.
CPC ............... *F28B 9/08* (2013.01); *F01K 9/00* (2013.01); *F01K 9/003* (2013.01); *F16T 1/22* (2013.01); *F16T 1/24* (2013.01); *F16T 1/386* (2013.01)

(58) Field of Classification Search
CPC ....... F28B 9/08; F16T 1/24; F16T 1/22; F16T 1/386; F01K 9/00; F01K 9/003
(Continued)

(56) References Cited

U.S. PATENT DOCUMENTS 5,401,142 A * 3/1995 Yumoto .................... F16T 1/24
                                                              417/132
5,445,501 A * 8/1995 Yumoto .................. F16K 31/26
                                                              251/75
(Continued)

FOREIGN PATENT DOCUMENTS

EP    0 768 487 B1    6/2002
GB    2354056    *    3/2001    ............... F16T 1/24

OTHER PUBLICATIONS

Int'l Search Report dated Apr. 4, 2018 in Int'l Application No. PCT/IB2018/050249.

*Primary Examiner* — Jessica Cahill
*Assistant Examiner* — Patrick C Williams
(74) *Attorney, Agent, or Firm* — Panitch Schwarze Belisario & Nadel LLP

(57) ABSTRACT

A pumping and trapping device is provided. The pumping and trapping device removes condensate from a heat exchanger even when upstream pressure in the device is lesser than the downstream pressure. The device includes a float operated mechanical linkage. The float is displaceable with respect to condensate level within a vessel of the device. The mechanical linkage is configured to selectively operate a steam inlet port and a steam outlet port configured on the vessel, thereby removing condensate accumulated within the vessel.

10 Claims, 9 Drawing Sheets

(51) Int. Cl.
    *F01K 9/00* (2006.01)
    *F16T 1/22* (2006.01)
    *F16T 1/38* (2006.01)

(58) Field of Classification Search
    USPC .......................................................... 417/132
    See application file for complete search history.

(56) References Cited

U.S. PATENT DOCUMENTS

| | | | | |
|---|---|---|---|---|
| 6,174,138 | B1* | 1/2001 | Stephens | F16K 31/18 |
| | | | | 417/126 |
| 8,858,190 | B2* | 10/2014 | Collins | F16K 31/26 |
| | | | | 417/132 |
| 2008/0240934 | A1* | 10/2008 | Yumoto | F04F 1/06 |
| | | | | 417/132 |

* cited by examiner

PUMPING AND TRAPPING DEVICE

CROSS-REFERENCE TO RELATED APPLICATION

This application is a Section 371 of International Application No. PCT/M2018/050249, filed Jan. 16, 2018, which was published in the English language on Jul. 26, 2018, under International Publication No. WO 2018/134725 A1, which claims priority under 35 U.S.C. § 119(b) to Indian Patent Application No. 201721002126, filed on Jan. 19, 2017, the disclosures of which are incorporated herein by reference in their entireties.

FIELD

The present disclosure relates to the field of devices for removing condensate from a heat exchanger.

Definition

The term "Stall" hereinafter in the specification will refer to a condition where the upstream pressure in a pumping and trapping device drops below the downstream pressure in the pumping and trapping device.

Background

Process industries require pressure powered pumps to pump fluid from a low upstream pressure zone to a higher downstream pressure zone. In certain operating conditions, the upstream pressure varies and either drops below or rises above the downstream pressure. In real-time situations, the upstream pressure changes according to the requirement of the system and therefore, neither a conventional pressure powered pump nor a steam trap is able to maintain the process efficiency.

Fluctuating upstream pressure is often experienced by processes which use steam to heat the fluid present in heat exchangers, thereby inducing stall frequently. In addition to that, mounting of the heat exchangers at a very low height from the ground provides very small filling heads to the pump for its operation. Conventional pressure powered pumps are unable to operate at such small filling heads, thus causing condensate to re-enter in the heat exchanger. This results in reduced heat transfer rate.

Conventional pumps described in the prior art typically use snap action mechanism with an extension spring for pumping fluid, which requires more accommodation space. Further, these pumps consist of a float rigidly connected to a lever/linkage which allows the float to rotate about a fixed point. Since the float and a float lever are rigidly connected, a tensile load is induced in the spring during trapping motion. The induction of the tensile load in the spring is not desirable as it leads to lowering the pressures up to which the device can remain operable in trapping mode.

Hence, there is a need of a pumping and trapping device that works consistently without affecting process efficiency at low heads as well as in stalling conditions and alleviates the abovementioned drawbacks.

OBJECTS

Some of the objects of the present disclosure, which at least one embodiment herein satisfies, are as follows:

An object of the present disclosure is to provide a device for pumping fluid from low upstream pressure zones to high upstream pressure zones.

Another object of the present disclosure is to provide a pumping and trapping device that works consistently even during stalling conditions.

Yet another object of the present disclosure is to provide a pumping and trapping device that is compact.

Yet another object of the present disclosure is to provide a pumping and trapping device that is easy to maintain.

Yet another object of the present disclosure is to provide a pumping and trapping device that does not affect process efficiency at low installation heads.

Yet another object of the present disclosure is to provide a pumping and trapping device that eliminates the possibility of induction of tensile load in a biasing member during trapping.

Yet another object of the present disclosure is to provide a pumping and trapping device that increases the per stroke discharge of the device by optimizing the utilization of the same internal volume.

Other objects and advantages of the present disclosure will be more apparent from the following description, which is not intended to limit the scope of the present disclosure.

SUMMARY

The present disclosure envisages a pumping and trapping device. The device comprises a vessel, a support bracket, a float, a float lever, a connecting link, a bell crank lever, a biasing member, an actuator link, and a trap valve. The vessel has a condensate inlet port in fluid communication with an outlet of a heat exchanger to receive condensate, a condensate outlet port in fluid communication with a condensate discharge pipe, a steam inlet port in fluid communication with a steam source, and a steam outlet port. The support bracket is connected to an inner wall of the vessel. The float is disposed within the vessel. The float has an extension rigidly connected to the float. The float lever is pivotally connected to the support bracket and the extension. The extension is configured to be angularly displaced about the pivotal connection between the float lever and the extension at a predetermined angle. In an embodiment, the predetermined angle ranges from 5° to 15°.

The connecting link is pivotally connected to the float lever proximal the support bracket. The bell crank lever is pivotally connected to the support bracket and the connecting link. The bell crank lever is configured to be displaced under influence of the connecting link. The biasing member is pivotally connected to the bell crank lever. The bell crank lever is configured to compress the biasing member under influence of the connecting link when the float is displaced in an operative upward or downward direction. The actuator link is pivotally connected to the biasing member and the support bracket. The actuator link is configured to be pivotally displaced about the pivotal connection between the actuator link and the support bracket under influence of the biasing member to operate a steam inlet valve and a steam outlet valve, thereby controlling steam flow through the steam inlet port and the steam outlet port respectively. The trap valve is pivotally connected to the extension and configured to be linearly displaced under influence of the float to control flow of condensate through the condensate outlet port.

The device comprises a first stopper configured on the float lever to restrict the pivotal displacement of the extension about the pivotal connection between the float lever and the extension beyond the predetermined angle.

The device comprises an inlet check valve configured at the condensate inlet port to allow inflow of condensate into the vessel and restrict outflow of condensate through the condensate inlet port.

The device comprises a non-return valve configured at the condensate outlet port to allow outflow of the condensate from the condensate outlet port and to restrict inflow of condensate into the vessel through the condensate outlet port.

In an embodiment, the biasing member is a spring.

In another embodiment, distance between pivotal connection of the bell crank lever and the support bracket and pivotal connection of the bell crank lever and the biasing member is more than distance between the pivotal connection of the bell crank lever and the support bracket and the pivotal connection between the bell crank lever and the connecting link.

In yet another embodiment, the ratio of distance between the pivotal connection of the float lever and the connecting link and the pivotal connection between the float lever and the extension to the distance between the pivotal connection of the float lever and the connecting link and the pivotal connection of the float lever and the support bracket is at least one.

The float lever, the connecting link, the bell crank lever, and the support bracket are configured to form a double crank mechanism.

BRIEF DESCRIPTION OF THE ACCOMPANYING DRAWING

A pumping and trapping device, of the present disclosure, will now be described with the help of the accompanying drawing, in which.

Figure 1:
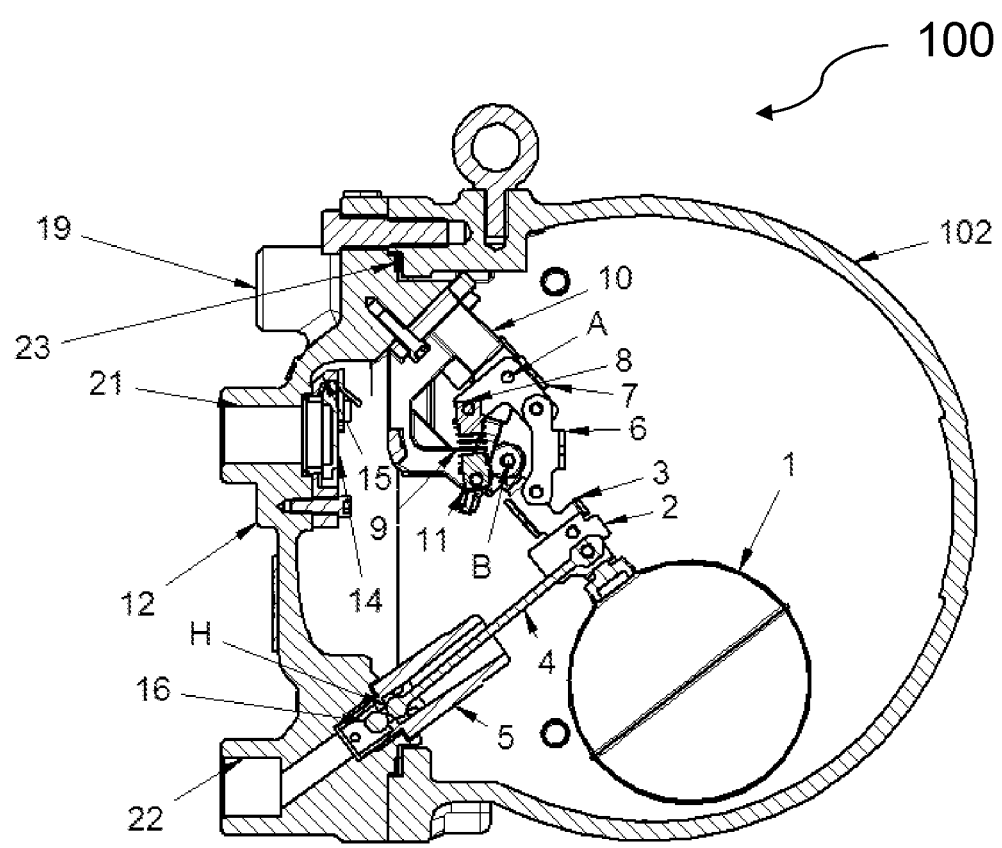
FIG. 1 illustrates a sectional view of the pumping and trapping device, in accordance with an embodiment of the present disclosure.
Figure 2:
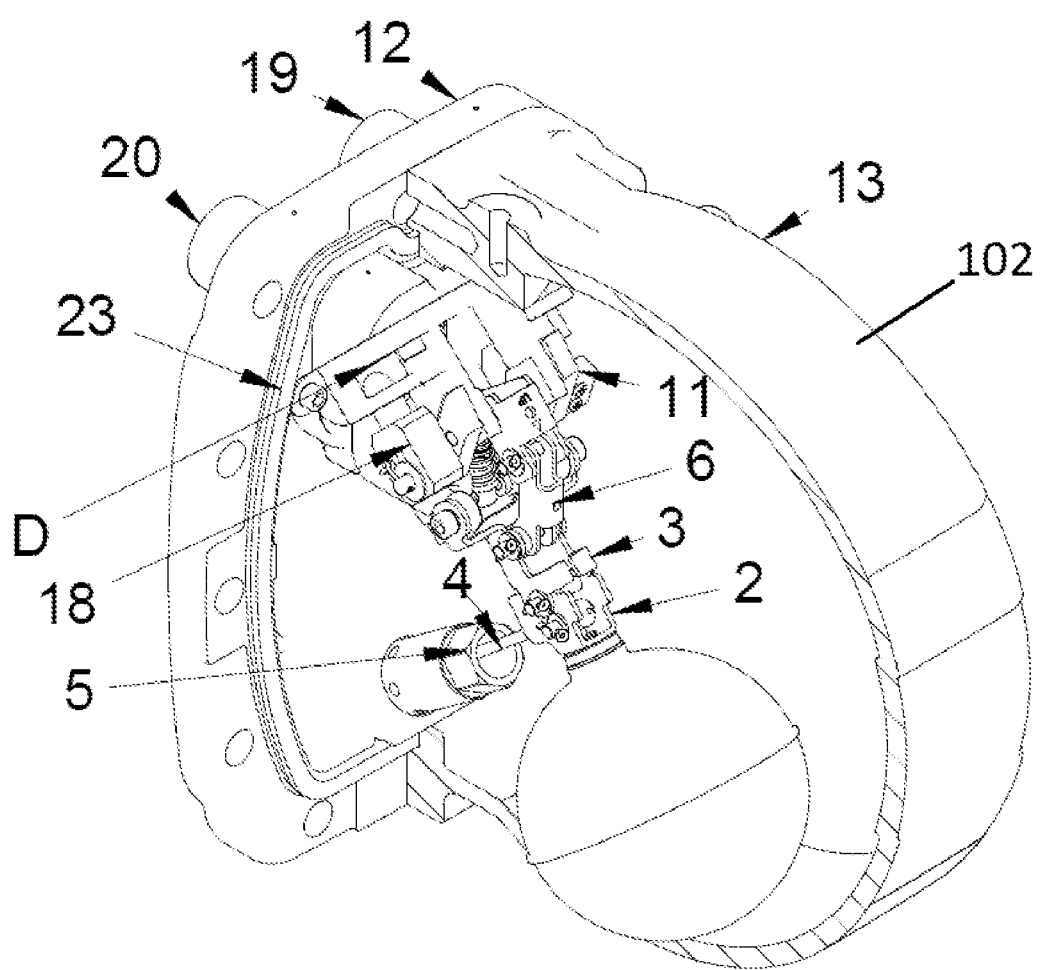
FIG. 2 illustrates an isometric view of the pumping and trapping device of FIG. 1.
Figure 3:
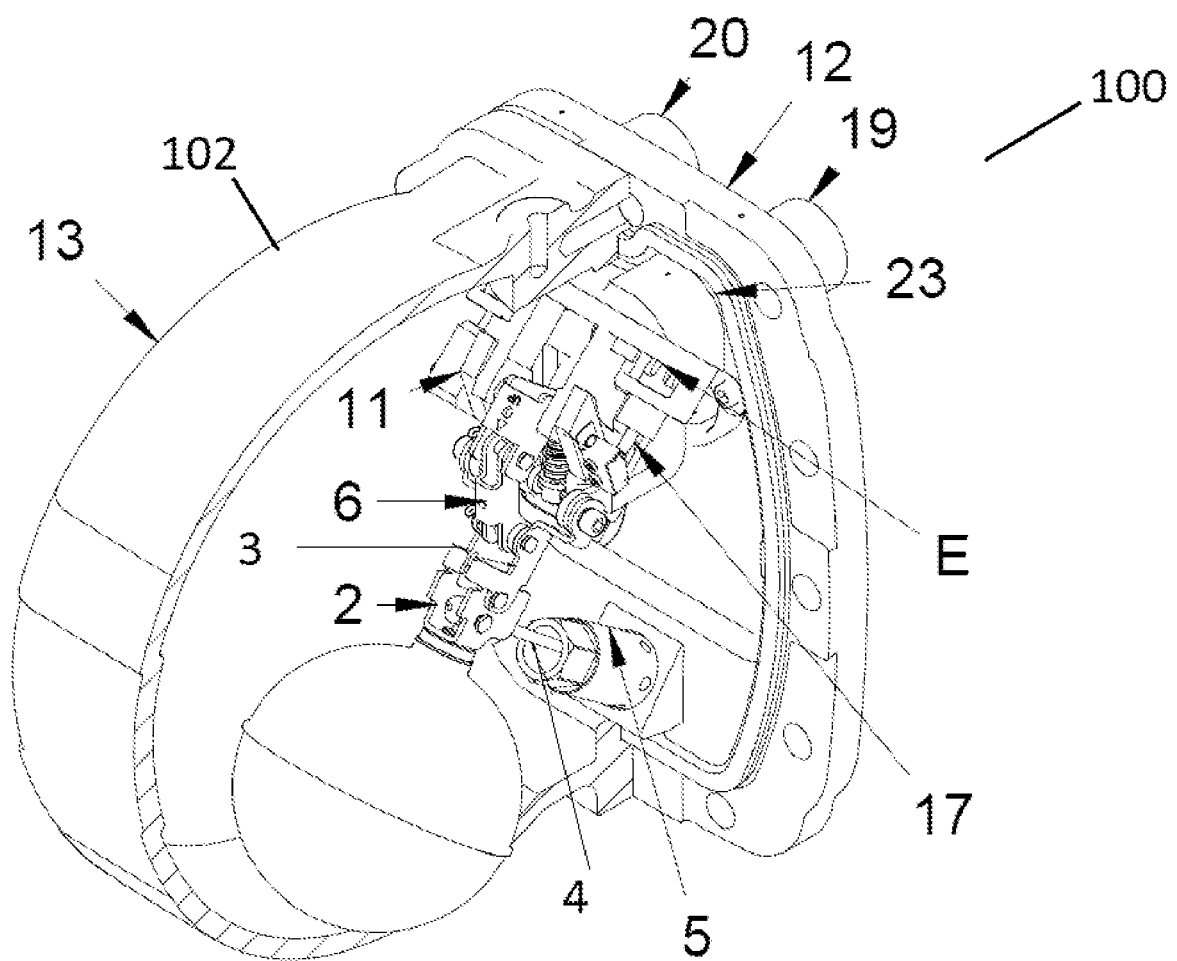
FIG. 3 illustrates another isometric view of the pumping and trapping device of FIG. 1.

FIG. 6, FIG. 7, FIG. 8, and FIG. 9 illustrate schematic views depicting various positions of linkages in the pumping and trapping device of the present disclosure when condensate starts filling in the pumping and trapping device.

LIST OF REFERENCE NUMERALS

| Reference numeral | References associated with reference numeral |
| --- | --- |
| 1 | Float |
| 2 | Extension |
| 3 | Float lever |
| 4 | Trap valve |
| 5 | Trap seat |
| 6 | Connecting link |
| 7 | Bell crank lever |
| 8 | One end of biasing member |
| 9 | Biasing member |

-continued

LIST OF REFERENCE NUMERALS

| Reference numeral | References associated with reference numeral |
| --- | --- |
| 10 | Support bracket |
| 11 | Actuator link |
| 12 | Base portion |
| 13 | Cover portion |
| 14 | Inlet check valve |
| 15 | Flap seat |
| 16 | Non-return valve |
| 17 | Steam inlet valve |
| 18 | Steam outlet valve |
| 19 | Steam inlet port |
| 20 | Steam outlet port |
| 21 | Condensate inlet port |
| 22 | Condensate outlet port |
| 23 | Sealing gasket |
| 100 | Pumping and trapping device |
| 102 | Vessel |
| 120 | Inlet check valve |
| 130 | Outlet check valve |
| 140 | Pressure balancing line |
| 150 | Heat exchanger outlet line |
| 160 | Condensate discharge pipe |
| 200 | Heat exchanger |
| 220 | Process fluid inlet |
| 230 | Process fluid outlet |
| 240 | Heat exchanger steam inlet |
| 300 | Storage tank |
| A | Main Pivot |
| B | Float Lever Pivot |
| C | Knuckled Pivot |
| D | Steam outlet orifice |
| E | Steam inlet orifice |
| F | First Stopper |
| G | Trap valve pivot |
| H | Condensate outlet orifice |
| J | Second stopper |
| K | Third stopper |

DETAILED DESCRIPTION

The present disclosure envisages a pumping and trapping device (hereinafter also referred to as "device") that effectively removes condensate from a heat exchanger even when pressure upstream of the device is equal, lesser or greater than pressure downstream of the device.

The device, of the present disclosure is now described with reference to FIG. 1 through FIG. 5.

Referring to FIG. 1 to FIG. 4, a device 100 is a float operated device which is capable of recovering condensate in conditions of trapping of fluid and pumping of fluid with installations at low heights. Trapping is a condition that occurs when upstream pressure in the device 100 is greater than the downstream pressure in the device 100 which causes condensate to enter the chamber of the device 100. Pumping is a condition that occurs when downstream pressure in the device 100 is greater than or equal to the upstream pressure in the device which again causes accumulation of condensate in the device 100. Stalling is a condition which occurs when the upstream pressure in the device 100 drops below the downstream pressure in the device 100.

The device 100 comprises a vessel 102. The vessel 102 is made of two portions, i.e., a base portion 12 and a cover portion 13. Both the base portion 12 and the cover portion 13 are connected to each other via fasteners. Further, a sealing gasket 23 is disposed at the interface of the base portion 12 and the cover portion 13 to restrict any fluid leakage. The vessel 102 has a condensate inlet port 21, a condensate outlet port 22, a steam inlet port 19, and a steam outlet port 20 configured thereon. More specifically, all the aforementioned ports 21, 22, 19, and 20 are configured on the base portion 12 of the vessel 102.

An inlet check valve 14 is configured at the condensate inlet port 21 to allow inflow of condensate into the vessel 102 and restrict outflow of condensate through the condensate inlet port 21. In an embodiment, the inlet check valve 14 has a flap-like configuration. The inlet check valve 14 rests against a flap seat 15.

Figure 5:
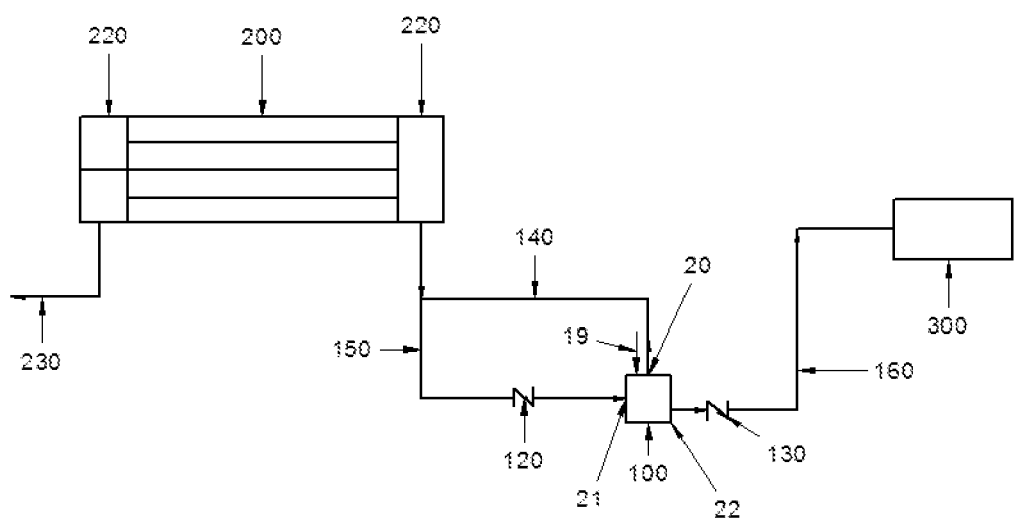
FIG. 5 illustrates a schematic view of a system in process industry with a pumping and trapping device of the present disclosure.

Referring to FIG. 5, the condensate inlet port 21 is in fluid communication with a heat exchanger 200 via a heat exchanger outlet line 150, and receives condensate from the heat exchanger. The condensate outlet port 22 is in fluid communication with a storage tank 300 via a condensate discharge pipe 160. The steam inlet port 19 is in fluid communication with a steam source (not shown in figures) and receives steam therefrom. In an embodiment, the steam source is a boiler. The steam outlet port 20 is in fluid communication with the heat exchanger outlet line 150 via a pressure balancing line 140. An outlet check valve 130 is provided on the condensate discharge pipe 160 to restrict the return flow of the condensate. Similarly, an inlet check valve 120 is provided on the heat exchanger outlet line 150 to restrict return flow of condensate into the heat exchanger 200.

The heat exchanger 200 is provided with process fluid inlet 220, a process fluid outlet 230, a heat exchanger steam inlet 240 and the heat exchanger outlet line 150. The device 100 receives condensate from the heat exchanger via the heat exchanger outlet line 150.

The construction and working of the device 100 is now described in more detail with reference to FIG. 1 to FIG. 9.

The device 100 includes a support bracket 10 connected to an inner wall of the vessel 102. More specifically, the support bracket 10 is connected to an inner side of the base portion 12 via fasteners. The device 100 further includes a float 1, a float lever 3, a connecting link 6, a bell crank lever 7, a biasing member 9, an actuator link 11, and a trap valve 4. All the aforementioned components are disposed within the vessel 102.

Figure 4:
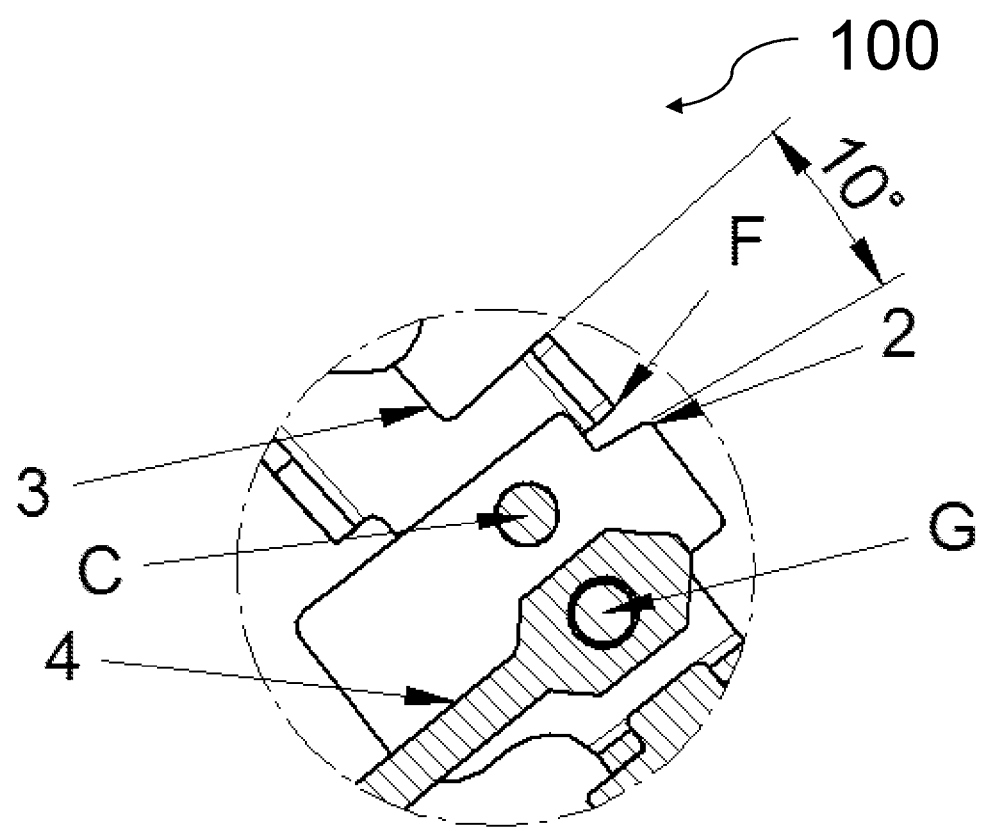
FIG. 4 illustrates a sectional view depicting details of the delay in trapping mode under operating condition of the pumping and trapping device of FIG. 1.

The float 1, which is disposed within the vessel 102, is floatable on the condensate. An extension 2 is connected with the float 1 and configured to be displaced along with the float 1. The float lever 3 is pivotally connected to the support bracket 10 at a pivot point B and the free end of the extension 2. The extension 2 is configured to be angularly displaced about the pivotal connection between the float lever 3 and the extension 2 at a predetermined angle. More specifically, the extension 2 is connected to the float lever 3 via a knuckled pivot joint C (as shown in FIG. 4) and the extension 2 is angularly displaceable about the knuckled pivot joint C.

The float 1 is pivotally connected to the float lever 3 at pivot point C through the extension 2.

In an embodiment, the predetermined angle ranges from 5° to 15°. More specifically, the predetermined angle, by which the extension 2 is pivotally displaced along the float lever 3, is 10° (as shown in FIG. 4). In another embodiment, a first stopper F is configured on the float lever 3 to restrict the pivotal displacement of the extension 2 beyond the predetermined angle.

In an embodiment, the float 1 has a shape selected from cylindrical, oblate shaped, a combination of a cylindrical body with spherical ends, spherical shape, or similar shapes. This is done to optimize the overall size of the device 100.

The pivotal displacement of the extension 2 about the knuckled pivot joint C facilitates more volume of condensate to be stored within the device 100. Thus a smaller sized device 100 can be used to store more volume of condensate as compared to other devices disclosed in the prior arts. Typically, the use of knuckled pivot C enables more efficient use of the existing chamber volume. The volume of condensate discharged by the device 100 per stroke increases by 22% for the same angular displacement of the float lever 3 as compared to the mechanisms used in prior arts.

The connecting link 6 is pivotally connected to the float lever 3 proximal to the support bracket 10 such that the ratio of distance between the pivotal connection of the float lever 3 and the connecting link 6 and the pivotal connection (pivot C) between the float lever 3 and the extension 2 to the distance between the pivotal connection of the float lever 3 and the connecting link 6 and the pivotal connection (pivot B) of the float lever 3 and the support bracket 10 is at least one. More specifically, the ratio of distance between pivot C and the pivotal connection (between the connecting link 6 and the float lever 3) and the distance between pivot B and the pivotal connection (between the connecting link 6 and the float lever 3) is at least one. The bell crank lever 7 is pivotally connected to the support bracket 10 and the connecting link 6. The bell crank lever 7 is configured to be displaced about the pivot A under influence of the connecting link 6. The biasing member 9 is pivotally connected to the bell crank lever 7. The bell crank lever 7 is configured to compress the biasing member 9 under influence of the connecting link 6 when the float 1 is displaced in an operative upward or downward direction. More specifically, the bell crank lever 7 has an 'L' shaped body defined by two arms and a common fulcrum at junction of two arms. The included angle between the arms is at least 90°. The arms are connected to the connecting link 6 and the biasing member 9. The bell crank lever 7 is pivotally connected to the support bracket 10 at a pivot point A.

One end of the bell crank lever 7 is pivotally connected to the connecting link 6. The displacement of the connecting link 6 causes the bell crank lever 7 to rotate about the pivot A on the support bracket 10.

In an embodiment, the biasing member 9 is a compression spring. The compression spring can be made of any suitable material.

The float lever 3, connecting link 6, bell crank lever 7, and the fixed pivot A and B on the support bracket 10 are configured to form a double crank mechanism.

The actuator link 11 is pivotally connected to the biasing member 9 and the support bracket 10. More specifically, one end 8 of the biasing member 9 is pivotally connected to one arm of the bell crank lever 7, whereas other end of the biasing member 9 is pivotally connected to the actuator link 11.

The bell crank lever 7 rotates and compresses the biasing member 9 as the actuator link 11 is fixed against a stopper in its initial position.

The actuator link 11 is configured to be pivotally displaced about the pivotal connection (pivot point A) between the actuator link 11 and the support bracket 10 under influence of the biasing member 9 to operate a steam inlet valve 17 and a steam outlet valve 18, thereby controlling steam flow through the steam inlet port 19 and the steam outlet port 20 respectively.

A steam inlet orifice E is configured at the steam inlet port 19. The steam inlet valve 17 closes or opens the steam inlet orifice E to restrict or allow flow of steam therethrough respectively. A steam outlet orifice D is configured at the steam outlet port 20. The steam outlet valve 18 closes or opens the steam outlet orifice D to restrict or allow flow of steam therethrough respectively.

The trap valve 4 is pivotally connected to the extension at a pivot joint G. The trap valve 4 is configured to be linearly displaced under influence of the float to control the flow of condensate through the condensate outlet port 22. Further, a trap seat 5 is configured proximal the condensate outlet port 22 to facilitate a sliding motion of the trap valve 4. Furthermore, a non-return valve 16 is configured between the condensate outlet port 22 and the trap seat 5. The non-return valve 16 only allows outflow of the condensate from the vessel 102 and restricts inflow of the condensate into the vessel 102 through the condensate outlet port 22. In an embodiment, the non-return valve 16 has a ball-like configuration.

The device 100 operates between two defined water levels within the chamber created by the base portion 12 and the cover portion 13. Subsequent paragraphs elaborate the operation of the device 100.

Figure 6:
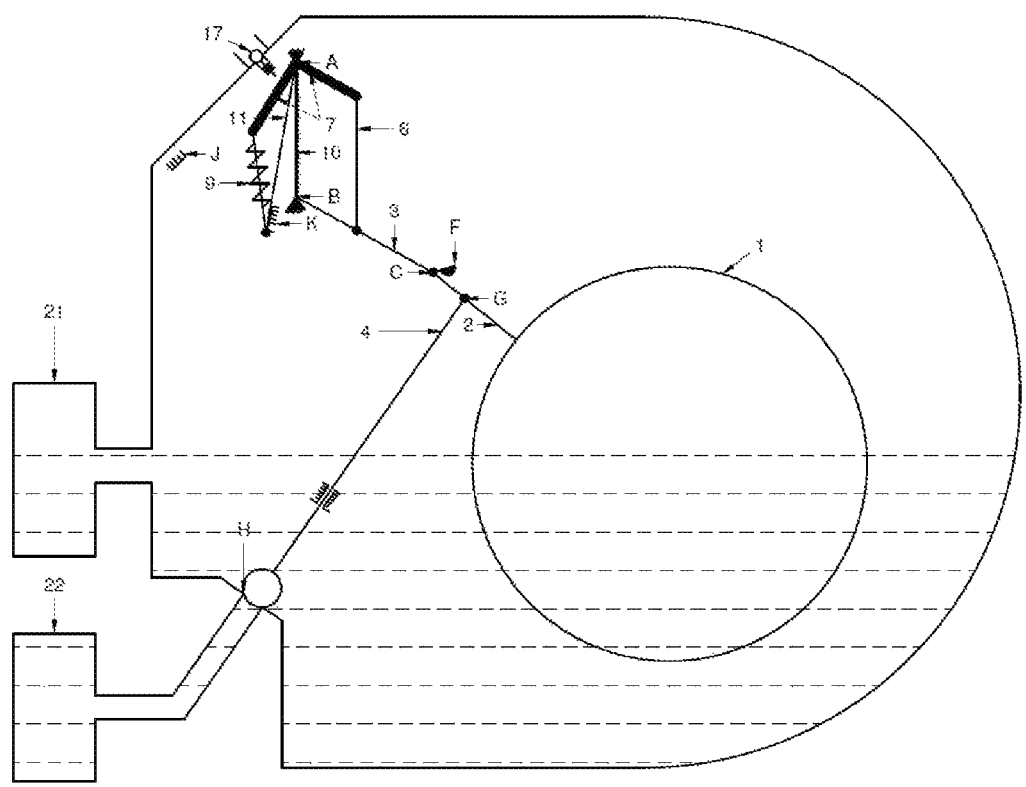
Figure 7:
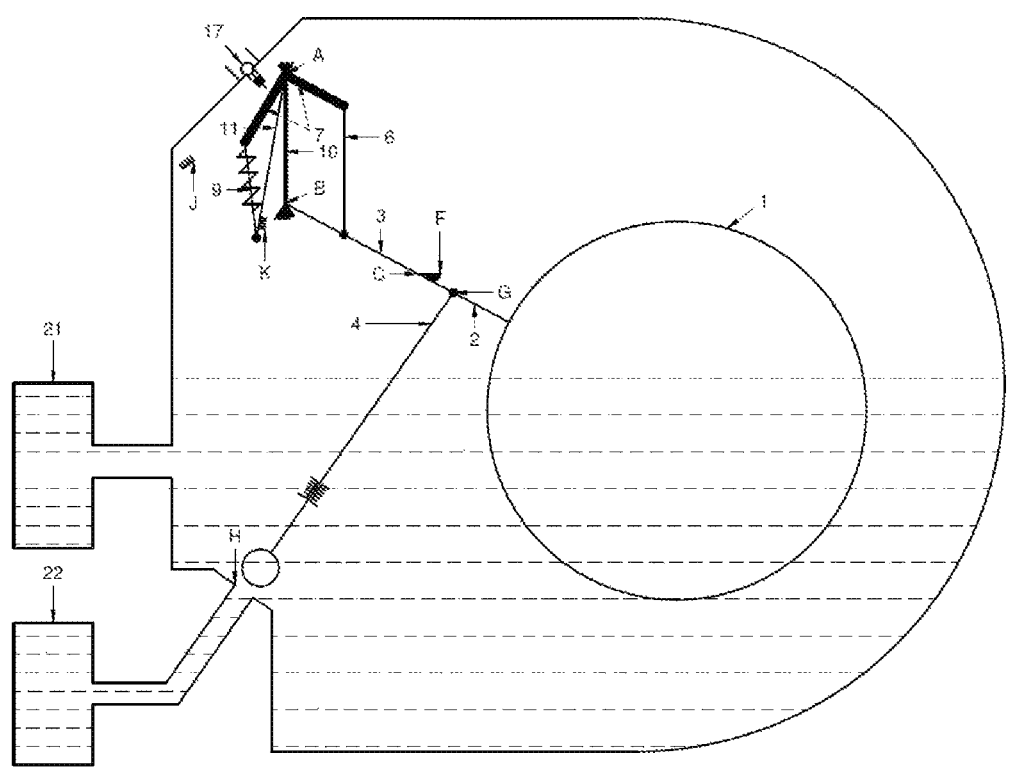

Initially, the actuator link 11 rests against a third stopper K configured on the support bracket (as shown in FIG. 6 and FIG. 7). One end of the actuator link 11 is pivotally connected to the support bracket 10 at the pivot point A. Further, the biasing member 9 is connected between the other end of the actuator link 11 and the second end of the bell crank lever 7.

During trapping, when the available upstream pressure is greater than the downstream pressure, condensate enters the chamber of the vessel 102, thereby raising the float 1 and pivoting the float 1 about the knuckled pivot C. The rising condensate level causes the float 1 to rotate about the pivot C up to a predetermined angular displacement. This rotation is controlled by the first stopper F.

The float 1 is configured to angularly displace upon receiving pressure, which causes the trap valve 4 to open. This allows condensate to flow through the condensate outlet port 22. This results in discharge of condensate with higher pressure as the knuckled motion of the float 1 utilized in trapping ensures that no spring (biasing member) compression is induced at the start of trapping. Such knuckled motion is continued till the extension 2 reaches the first stopper F which amounts to an angular displacement sufficient enough to handle the flow of the high pressured condensate through the condensate outlet port 22. Such angular displacement is typically between 5° to 15°.

The condensate keeps entering the chamber of the vessel 102 when the upstream pressure drops below the downstream pressure, which causes the float 1 to rise further. Displacement of the float 1 beyond the predetermined angular displacement (5° to 15°) causes the extension 2 to engage with the float lever 3 and make the float lever 3 rotate about fixed pivot B on the support bracket 10.

When the stopper F is engaged, the float lever 3 and the extension 2 act as a single link.

Figure 8:
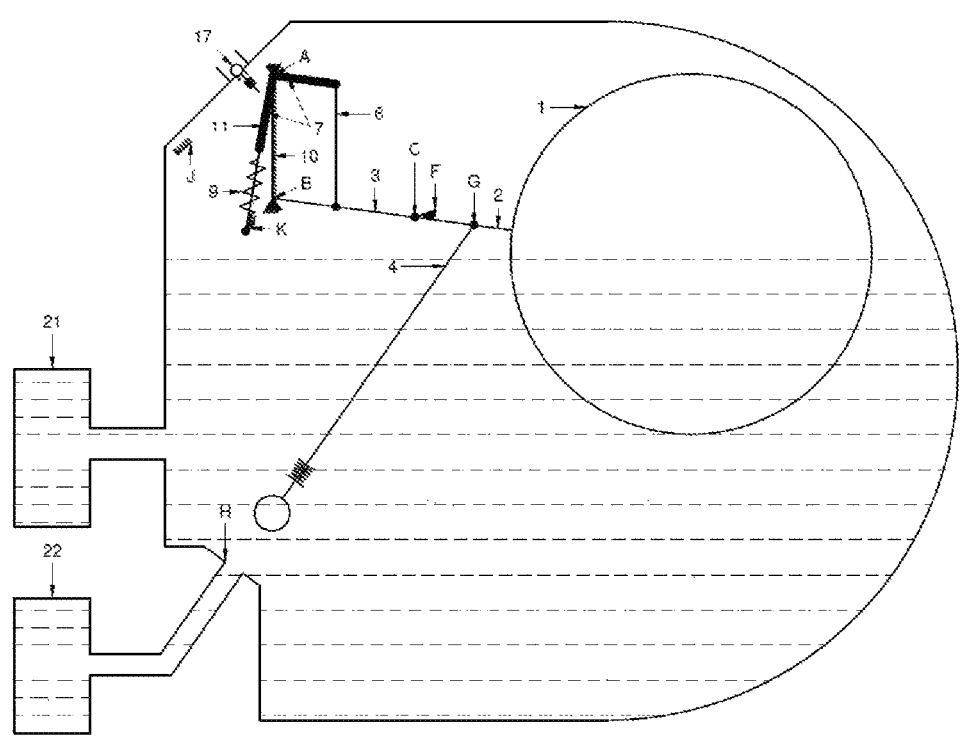
Figure 9:
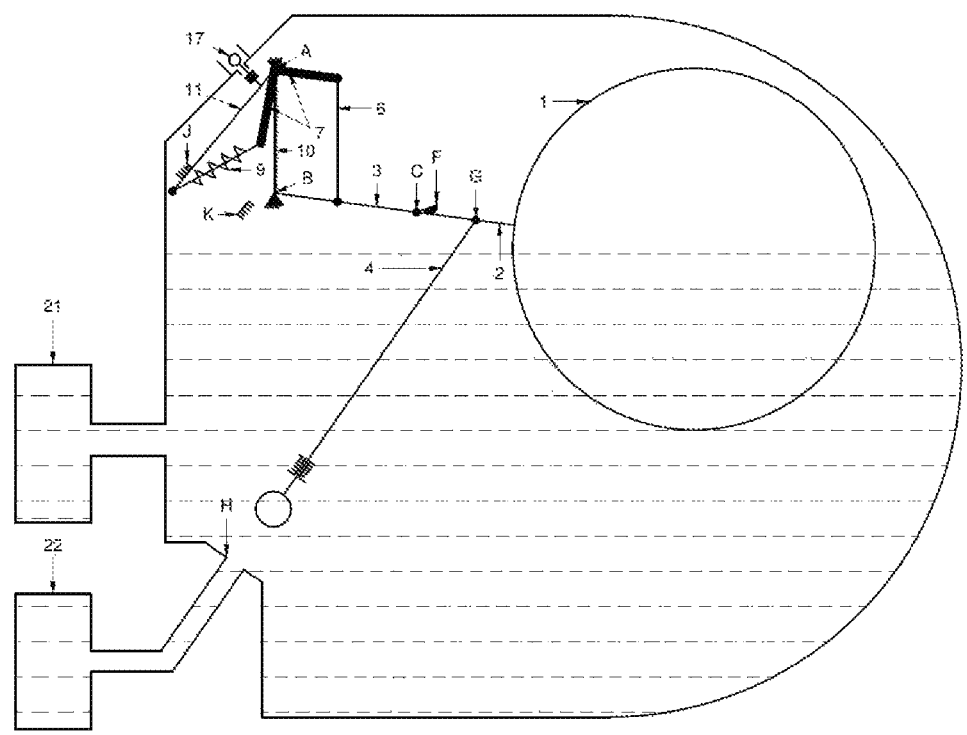

As the float lever 3 rotates about the pivot point B, the bell crank lever 7 rotates about the pivot A which causes compression of the biasing member 9. When the biasing member 9, actuator link 11 and the bell crank lever 7 become co-linear (when the actuator link 11 is parallel to the biasing member 9), any further movement of the bell crank lever 7 triggers a change in direction of the spring force which releases the stored energy of the biasing member 9 and causes actuator link 11 to rotate and snap about the main pivot A, and reach to a second stable position determined by a second stopper J configured on the support bracket 10 (as shown in FIG. 8 and FIG. 9). The rotating actuator link 11 is configured to push the steam inlet valve 17 to open steam inlet orifice E and simultaneously is configured to move the steam outlet valve 18 to close the steam outlet orifice D. The open steam inlet orifice E allows the motive steam to enter the chamber and pressurize the condensate to overcome the downstream pressure and flow through the condensate outlet orifice H in the trap seat 5. The condensate level falls during pumping cycle, and subsequently the float 1 moves in the downward direction. When the condensate reaches the lower water level, the bell crank lever 7, the biasing member 9, and the actuator link 11, once again become co-linear, thereby triggering the actuator link 11 to snap and rotate to regain its initial position as at the beginning of the pumping cycle.

Some of the advantages of the device 100 disclosed in the present disclosure are now elaborated in subsequent paragraphs.

The device 100 is can be easily disassembled as the base portion 12 and the cover portion 13 are fastened to each other using fasteners. Further, the support bracket 10 is connected to the base portion 12. All the other components, i.e., the float 1, the extension 2, the float lever 3, the trap valve 4, the connecting link 6, the bell crank lever 7, the biasing member 9, and the actuator link 11 are coupled to the support bracket 10. Thus, in case of maintenance, the base portion 12 can be easily disassembled and further inspected for troubleshooting. Therefore, the device 100 is convenient from maintenance point of view.

The knuckled pivot point C makes the trapping action independent of the connecting link 6, the bell crank lever 7, and the biasing member 9. This eliminates the possibility of spring stretching during trapping, thereby reducing force required to open trap valve 4 and enabling the opening of the trap valve 4 to a higher pressure. Further, angular displacement of the extension 2 results in increase in per stroke discharge of the device 100 as the same internal volume is utilized more effectively. Such angular displacement increases the per stroke discharge by at least 10%.

During operation of the device 100, the distance between the main pivot A and the spring end 8 is kept more than the distance between main pivot A and the pivotal joint of the bell crank lever 7 and the connecting link 6. This enhances the utilization of the available float buoyancy as compared to conventional devices/pumps.

The configuration of the biasing member 9, the bell crank lever 7, the connecting link 6, and the support bracket 10 makes the device 100 compact. The implication of the compactness of the device 100 is that it requires less space for installation.

The present disclosure further envisages a method of removing condensate by the pumping and trapping device 100 when the pressure downstream of the device 100 is greater than the pressure upstream of the device 100. The method includes the following steps.

Initially, the float 1 is pivotally displaced in the operative upward direction about the pivot point C when condensate level within the device 100 rises above a predetermined upper level.

The trap valve 4 is opened which is coupled to the float 1. During trapping, the condensate accumulated within the device 100 flows out through the trap valve 4. During pumping operation, the condensate starts filling in the device 100 as the downstream pressure is greater than the upstream pressure in the device 100. As the condensate level rises within the device 100, the float 1 is further displaced in the operative upward direction. Further, the steam inlet orifice E is opened to allow steam to enter the device 100, thereby pressurizing the condensate within the device 100. Motive steam exerts pressure on the condensate within the device 100 which compensates the downstream pressure in the device 100. Thus, condensate flows out of the device 100 through the trap valve 4. When condensate level within the device 100 falls below a predetermined lower level, the steam inlet orifice E is closed and the steam outlet orifice D is simultaneously opened to remove the steam from the device 100.

TECHNICAL ADVANCEMENTS

The present disclosure described herein above has several technical advantages including, but not limited to, the realization of a pumping and trapping device that:
pumps fluid from low upstream pressure zones to high upstream pressure zones;
is compact;
easy to maintain;
does not affect process efficiency at low installation heads;
works consistently even during stalling conditions;
does not acquire a lot of space for installation
eliminates the possibility of induction of tensile load in a biasing member during trapping;
increases the per stroke discharge of the device by optimizing the utilization of the same internal volume; and
provides for an integral inlet check valve and non-return valve.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A trapping and pumping device (100), said device (100) comprising:
a vessel (102) having a condensate inlet port (21) in fluid communication with an outlet of a heat exchanger (200) to receive condensate, a condensate outlet port (22) in fluid communication with a condensate discharge pipe (160), a steam inlet port (19) in fluid communication with a steam source, and a steam outlet port (20);
a support bracket (10) connected to an inner wall of said vessel (102);
a float (1) disposed within said vessel (102), said float (1) having an extension (2) connected to said float (1);
a float lever (3) pivotally connected to said support bracket (10) and said extension (2), wherein said extension (2) is configured to be angularly displaced about the pivotal connection between said float lever (3) and said extension (2) at a predetermined angle;
a connecting link (6) pivotally connected to said float lever (3) proximal said support bracket (10);
a bell crank lever (7) pivotally connected to said support bracket (10) and said connecting link (6), said bell crank lever (7) configured to be displaced under influence of said connecting link (6);
a biasing member (9) pivotally connected to said bell crank lever (7), wherein said bell crank lever (7) is configured to compress said biasing member (9) under influence of said connecting link (6) when said float (1) is displaced in an operative upward or downward direction;
an actuator link (11) pivotally connected to said biasing member (9) and said support bracket (10), said actuator link (11) is configured to be pivotally displaced about the pivotal connection between said actuator link (11) and said support bracket (10) under influence of said biasing member (9) to operate a steam inlet valve (17) and a steam outlet valve (18), thereby controlling steam flow through said steam inlet port (19) and said steam outlet port (20) respectively; and a trap valve (4) pivotally connected to said extension (2) and configured to be linearly displaced under influence of said float (1) to control flow of condensate through said condensate outlet port (22).

2. The device (100) as claimed in claim 1, wherein said predetermined angle ranges from 5° to 15°.

3. The device (100) as claimed in claim 1, wherein a first stopper (F) is configured on said float lever (3) to restrict said pivotal displacement of said extension (2) about the pivotal connection between said float lever (3) and said extension (2) beyond said predetermined angle.

4. The device (100) as claimed in claim 1, wherein an inlet check valve (14) is configured at said condensate inlet port (21) to allow inflow of condensate into said vessel (102) and restrict outflow of condensate through said condensate inlet port (21).

5. The device (100) as claimed in claim 1, wherein a non-return valve (16) is configured at said condensate outlet port (22) to allow outflow of said condensate from said condensate outlet port (22) and to restrict inflow of condensate into said vessel (102) through said condensate outlet port (22).

6. The device (100) as claimed in claim 1, wherein said biasing member (9) is a spring.

7. The device (100) as claimed in claim 1, wherein the distance between the pivotal connection of said bell crank lever (7) and said support bracket (10) and the pivotal connection of said bell crank lever (7) and said biasing member (9) is more than the distance between the pivotal connection of said bell crank lever (7) and said support bracket (10) and the pivotal connection between said bell crank lever (7) and said connecting link (6).

8. The device (100) as claimed in claim 1, wherein the ratio of distance between the pivotal connection of said float lever (3) and said connecting link (6) and the pivotal connection (pivot C) between said float lever (3) and said extension (2) to the distance between the pivotal connection of said float lever (3) and said connecting link (6) and the pivotal connection (pivot B) of said float lever (3) and said support bracket (10) is at least one.

9. The device (100) as claimed in claim 1, wherein said float lever (3), said connecting link (6), said bell crank lever (7), and said support bracket (10) are configured to form a double crank mechanism.

10. A method of removing condensate by using the trapping and pumping device (100) according to claim 1 when the pressure downstream of said device (100) is greater than the pressure upstream of said device (100), said method comprising the following steps:

pivotally displacing the float (1) disposed within said device (100) about a pivot point (pivot C) when a condensate level within said device (100) rises above a predetermined upper level;

opening the trap valve (4) coupled to said float (1);

opening a steam inlet orifice (E) to allow steam to enter said device (100), thereby pressurizing said condensate within said device (100); and simultaneously closing said steam inlet orifice (E) and opening a steam outlet orifice (D) to remove steam from said device (100) when condensate level within said device (100) falls below a predetermined lower level.

* * * * *